United States Patent Office 3,301,925
Patented Jan. 31, 1967

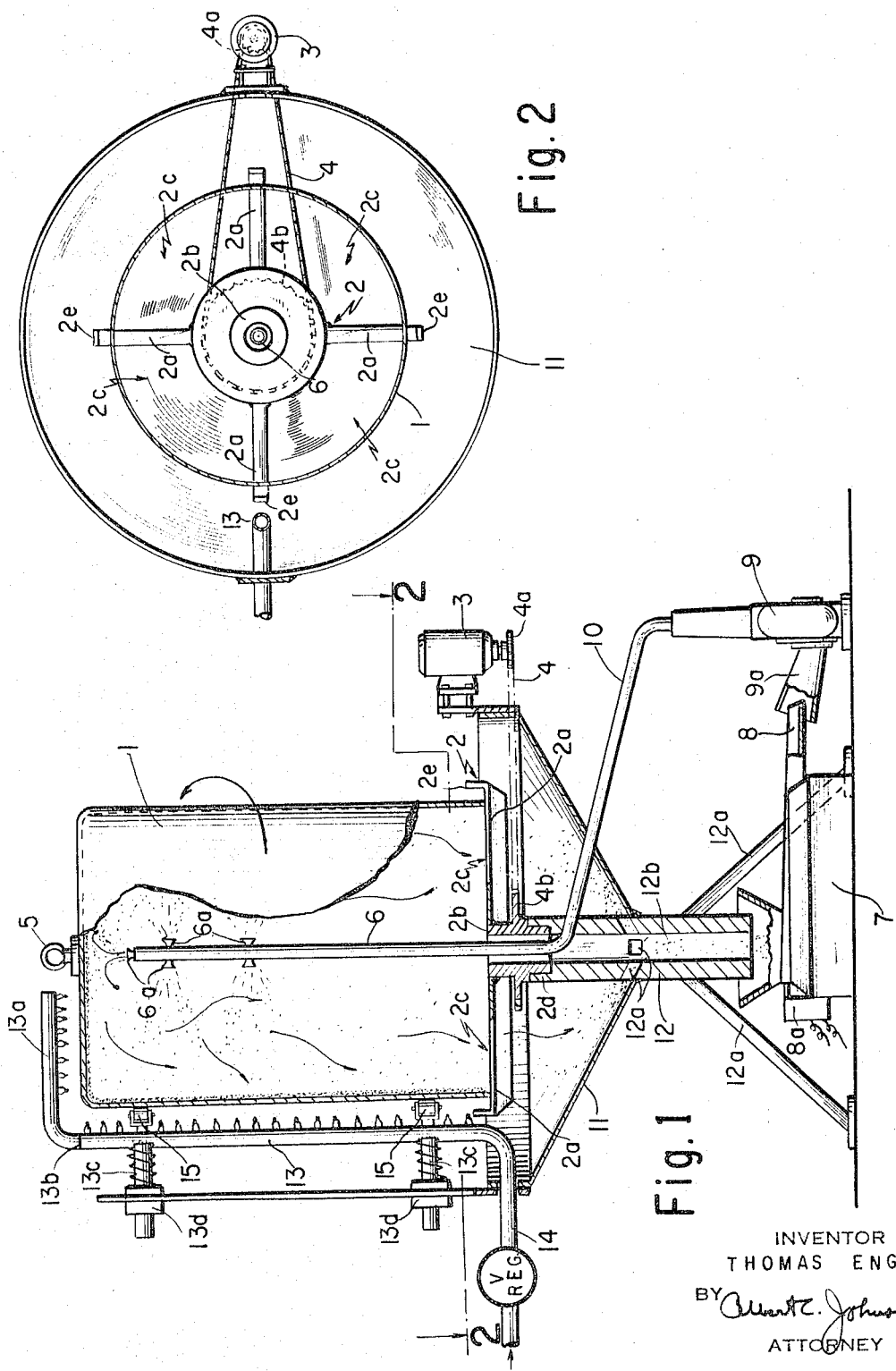

3,301,925
PROCESS AND APPARATUS FOR MOLDING HOLLOW ARTICLES FROM SYNTHETIC THERMOPLASTIC MATERIALS
Thomas Engel, Heusenstamm, Offenbach am Main, Germany, assignor to Vasco Industries Corp., New York, N.Y., a corporation of New York
Filed Dec. 6, 1962, Ser. No. 242,771
Claims priority, application Germany, Dec. 7, 1961, E 22,087
13 Claims. (Cl. 264—37)

This invention relates to the manufacture of containers and other hollow articles from synthetic thermoplastic materials which form a film under the action of heat, and more particularly to a process and apparatus for producing molded containers and other molded hollow articles of relatively large dimensions.

It has already been proposed to manufacture such articles by introducing into a mold a quantity of finely divided thermoplastic material in excess of that necessary to form the desired article, heating the mold to fuse on its inner surface a film or layer of the thermoplastic material having the thickness desired for the wall of the article, and then emptying the excess material from the mold.

It has also been proposed to produce rotationally symmetrical hollow articles by partially filling a mold with finely divided thermoplastic material so that the mold is, for example, about two-thirds full, and heating the mold while rotating it slowly about its axis with the axis horizontal.

In still another known technique, hollow articles are produced by charging a hollow mold with a measured quantity of a finely divided thermoplastic material and then, while keeping the mold closed and heating it externally, rotating the mold about two relatively perpendicular axes simultaneously or rotating it about one of such axes while rocking it about the other until all of the charge has been distributed over and fused on the mold wall.

An object of this invention is to provide a process and apparatus for carrying out the process whereby the molding of containers and other relatively large hollow articles which are open at one end thereof can be carried out more economically and/or with better control and greater variability of operating conditions and product qualities than in the use of known molding techniques.

According to the present invention, a process is provided for the manufacture of containers and other hollow articles from synthetic thermoplastic material, in which particles of such material in liquid, powdered or granular form are brought into contact with the heated wall of a mold, so as to cling thereto and form a continuous fused film or layer thereon, by spraying the material onto the hot internal surface of the mold, and in which any portion of the sprayed material that does not adhere to the mold wall is passed continually out of the mold by gravity flow through an open end thereof. The non-adhered material then is collected below the open end of the mold and may be returned into the mold through the spraying device until it becomes adhered to the mold surface as part of the fused layer being built up thereon to form the desired article.

According to another aspect of the invention, new arrangements of apparatus are provided for carrying out the new process. This apparatus comprises a table for supporting the mold in inverted position, a device for spraying the thermoplastic material into a mold on the table, and means for heating the mold in a regulatable manner. The table advantageously is a turntable rotatable about a vertical axis and adapted to support a hollow mold that is open at one end with the open end of the mold facing downwardly and arranged so that the particles not clinging to the hot mold surface will fall freely out of the mold opening. Associated with the turntable is a relatively fixed burner or the like for heating the mold thereon, and a spraying device is arranged to direct a spray of thermoplastic material into the heated rotating mold to the inner surface thereof, together with means for feeding the thermoplastic material at a controlled rate to the spraying device and a device below the mold opening for collecting thermoplastic material that is sprayed into the mold but not adhered to the surface thereof. The apparatus may also include to advantage a pipe leading the non-adhered material from the collecting device back to the feeding means.

The process and apparatus according to the invention may be used to manufacture containers and other hollow articles from any synthetic thermoplastic resin material that is capable of forming a film under the influence of heat. Examples of such materials are polyethylene, polystyrene and polyvinyl chloride of the kind generally termed "soft."

Other objects and features of the invention and advantages attainable by its use will be apparent from the following detailed description and the accompanying drawing of an illustrative embodiment of the invention.

In the drawing:

FIG. 1 is a diagrammatic elevational view, partly in vertical section, of one form of apparatus for carrying out the invention; and FIG. 2 is a plan view of parts thereof, partly in section, taken along line 2—2 of FIG. 1.

Referring to the drawing, a cylindrical mold 1 made of sheet metal and closed at one end only, which serves in the case illustrated for the production of a cylindrical container closed at one end, is mounted on a turntable 2 with the open end of the mold directed downwards. The turntable 2 is defined by arms 2a which radiate from a central hub structure 2b so that open spaces 2c are provided between the arms for the free flow through the turntable of particulate material falling from the mold 1.

The turntable 2 is mounted for rotation on a vertical axis, as by engagement of a lower end of the hub structure 2b into a bearing 2d at the upper end of a fixed member 12. That member in turn is suitably supported on a base or floor surface, as by tripod struts 12a or the like. Slow rotation of the turntable about its vertical axis is produced by an electric motor 3 through a chain or belt 4 connecting a driving sprocket or pulley 4a of the motor, possibly with the interposition of a speed reduction gear, with a driven sprocket or pulley 4b on the hub structure 2b.

The turntable arms can be provided with upturned ends 2e or other suitable means for retaining the mold 1 in working position. Each mold 1 is provided with a handle such as a suspension ring 5, or the like, for easy manipulation of the mold when positioning it on or removing it from the turntable.

Extended to a location inside the mold 1 is a device for spraying the thermoplastic material and distributing it in the required manner. In the simplest case, as illustrated, this device is a spraying pipe 6 which is provided with spraying nozzles 6a and which projects centrally into the interior of mold 1. The nature, number and distribution or arrangement of the spraying nozzles can be selected according to the size and shape of the article to be manufactured, and also the condition and particle size of the plastic material to be sprayed. Instead of providing a single central straight pipe 6, it is also possible to provide several spraying pipes arranged in predetermined positions and directions, and also to have such pipes branched or bent to certain desired configurations. Such varied arrangements are especially useful for the manufacture of molded articles of complicated form. Spraying devices which are annular, disc-shaped, cylindrical or of other rotationally symmetrical forms can likewise be used to advantage in special cases.

The spraying pipe 6 in the illustrated embodiment extends substantially parallel to a heating pipe 13 arranged externally of the mold. It will be apparent that spraying devices having radial branches may be used and that the spraying devices may be given reciprocatory or rotary movements, such as by fitting them with mechanisms of the kind known in connection with lawn sprinklers so that they will be moved by the rearward thrust of the stream of thermoplastic material being discharged from them.

The thermoplastic material to be sprayed is supplied continuously or in a predetermined quantity to a feed device 7 which includes a trough 8 vibratable by a suitable vibrating device 8a so as to control the rate of flow of the material to the intake port 9a of a blower 9. An arrangement of this nature is especially suitable for the molding of pulverized thermoplastic materials, such, for example, as powdered polyethylene.

The blower 9 feeds the plastic material continuously in suspension in a stream of air through the pipe 10 to the spraying pipe 6, from which it is projected through the spraying nozzles 6a toward and against the heated internal wall surface of the mold 1. The plastic particles which do not adhere to the mold wall in this operation fall downwardly inside the mold to pass through its open end and through the turntable openings 2c into a collecting funnel 11. The free or non-adhered particles collected in the funnel 11 flow from it through openings 12a and a vertical passageway 12b in pipe member 12, thus falling into the vibrating trough 8 in order once again to be fed into the mold by the blower as above described. A blower such as indicated at 9 is capable of handling thermoplastic materials in powder form or in coarse or fine granular form. When the thermoplastic material to be molded is being used in liquid form, the blower 9 is replaced by a pump.

In the embodiment illustrated, an elongated tubular gas burner 13 provided with a regulating valve in its fuel supply pipe 14 serves for heating the mold 1. This burner extends parallel to the longitudinal side of the mold and has a radial extension 13a overlying approximately half the upper end or base surface of the mold. It is advantageous for the burner or its radial extension 13a to be made pivotable, as by providing a swivel joint at 13b for the extension, so that the radial extension may be swung away from its normal position when it is desired to place a mold on or remove a mold from the turntable.

In order to maintain a desired spacing between the mold 1 and the burner 13, the burner is mounted on arms 13c slidably positioned in supporting blocks 13d and provided with feeler rollers 15 which are spring-pressed against the outside of the rotating mold. These feeler rollers operate according to the principle known in connection with reproduction milling machines. By their use it becomes possible to employ molds, and to produce molded articles, which are rectangular, polygonal, oval or otherwise not of rotationally symmetrical form in cross-section.

It will be apparent that various other forms and kinds of heating means may be used for heating the exterior of the mold on the turntable. Electrical heaters or hot fluid circulation pipes may be used. The heating means may be arranged to heat the whole wall of the mold simultaneously, in which case the mold need not be rotated, instead of being arranged to heat a rotating mold in a single diametral plane of the mold as illustrated in FIG. 1. The heating means may be arranged to effect greater heating of some areas of the mold than of other areas.

The apparatus illustrated may, if desired, be provided with a heat-insulated external housing, although no such housing is shown in the drawing.

The operation of the illustrated embodiment is as follows:

First of all, the mold 1 is positioned on the turntable 2, the gas burner is ignited and the motor 3 is switched on, so that the mold is heated and rotated. When the mold has been heated to the temperature desired for the fusion of the thermoplastic material on its inner surface, the vibrator of trough 8 and the blower 9 are started in operation, whereupon a stream of particles of the thermoplastic materials is sprayed continuously onto the heated inner surface of the mold. Some of the particles adhere to the hot mold surface and fuse together on it, building up on it progressively to form a continuous layer of the shape required for the molded article. Others of the particles fall freely through the mold and out of its open end to be collected and recirculated in the spray as above described. After the required layer thickness has been reached on the mold wall, the vibrating trough 8 and the blower are switched off. If it is desired that the inner surface of the molded article be smoothened, the mold is further heated for a period of time sufficient to coalesce rough plastic particles at the inside of the fused layer into a smooth film surface. The intensity of the heating can be modified for this purpose if desired. The heating cycle having been terminated, the article formed in the mold is cooled therein and then may be removed from the mold. The cooling can be effected according to this invention by use of the blower 9 to project a stream of cooling air against the article inside the mold. As soon as the synthetic plastic is sufficiently solidified, the mold is removed from the turntable and another mold is positioned thereon, so that the manufacturing process can be immediately repeated.

Instead of being blown into the mold, the plastic material in pulverulent form can be projected against the wall of the mold by a propeller-like rotor rotating at high speed. The plastic powder is supplied to the rotor by a worm that discharges the material from the center of the rotor boss. This whirling delivery of a spray of the material without use of an air stream is particularly useful for the production of articles having angular shapes, because it easily avoids the formation of shadow zones or pockets that cannot always be avoided when working with compressed air. Another way to spray the material without using compressed air is to employ a rotating disc to which the plastic is delivered in powder form and from which the particles are scattered to the mold surface by centrifugal force. The propeller-like rotor or rotating disc can be moved vertically in the mold to distribute the thermoplastic material over the whole inner surface of the mold.

One of the advantages of the process according to the invention is that the mold is charged at most with the weight of plastic material required for the finished molded article. It does not have to carry the substantially higher weight of powder or liquid which is used in most of the known processes.

By having the mold positioned on a turntable that is rotated slowly about a vertical axis, the use of clamping devices such as are necessary when a mold is rotated about a horizontal axis, or simultaneously about two axes, becomes superfluous, and there are no compressive or tensile stresses to necessitate reinforcements on the mold. Consequently, molds having very thin walls can even be used for the manufacture of very large molded articles, and savings of labor and material are realized in the manufacture of the molds. Moreover, the small thickness of the mold wall facilitates the transfer of heat through it, both during the heating and molding operations and when cooling the mold with an article formed in it, so that heating energy is saved and the manufacturing time is shortened.

Furthermore, the quantity of thermoplastic material to be sprayed can be accurately determined in advance, so that the finished articles can be produced continually with constant weights. This is extremely important in commercial practice.

The process of the invention can be carried out so as to produce molded articles having homogeneously developed local reinforcements, without a separate working step, by increasing the rate at which the thermoplastic material is applied to the areas where reinforcement is required.

Articles having particularly homogeneous and dense walls can be produced by virtue of the fact that the thermoplastic material is projected by impact pressure and at relatively high speed against the wall of the mold.

The process also enables the economical manufacture of molded articles in which a single-layer molded wall is homogeneous as regards the thermoplastic material used but is formed with differently colored regions, for example, at its outside and inside surfaces. If desired, an opaque coloring can also be provided in the article, for example, in the middle part of the molded plastic wall. Differently colored regions can be produced in the articles merely by supplying differently colored or pigmented thermoplastic powders or liquids into the mold at appropriate times during the normal working operation. When doing this it is advantageous to use a separate vibrating trough for each color. The multi-colored thermoplastic products thus obtained are composed of a uniform thermoplastic layer that shows good properties as regards durability notwithstanding that it has one or more dyes or pigments incorporated into the thermoplastic material.

The process can also be used to produce containers or other articles of multi-layer construction, in which the different layers are composed of different thermoplastic materials. For example, one layer may be of polyethylene and another of polyvinyl chlroide. Obviously the different materials may be of different colors if desired.

What is claimed is:

1. The process of producing a shaped hollow article, which comprises
    providing a hollow mold that is open at one end and has an internal surface of the configuration of the article to be produced,
    providing a thermoplastic resin material that will form a film under the influence of heat in a measured quantity corresponding to the desired weight of said article, and
    while supporting the mold with its open end facing downward and heating it to a temperature sufficient to fuse said material on said internal surface,
    spraying particles of said material substantially evenly to said surface,
    adhering to said surface and fusing together thereupon by the heat of said surface some of the spray particles as they impinge upon said surface in the spray,
    flowing through said open end and collecting below the mold the spray particles not adhered to said surface,
    and continually re-spraying said non-adhered particles to said surface,
    until substantially all of said quantity has been adhered to and fused into a layer covering said surface.

2. The process of producing a shaped hollow article from a thermoplastic resin material, that will form a film under the influence of heat, which comprises
    providing a hollow mold having an open end and having an internal surface of the configuration of the article to be produced, and
    while supporting the mold with its open end facing downward and rotating it about a vertical axis aligned with its end opening and heating it externally to a temperature sufficient to fuse said material on said internal surface,
    spraying particles of said material substantially evenly to said surface,
    adhering to said surface and fusing together thereupon by the heat of said surface some of the spray particles as they impinge upon said surface in the spray,
    flowing through said open end and collecting below the mold the spray particles not adhered to said surface,
    and continually re-spraying said non-adhered particles to said surface,
    until the sprayed material has been built up into a fused layer of the thickness required for said article and covering said surface.

3. The process of producing a shaped hollow article from a thermoplastic resin material in powder form that will form a film under the influence of heat, which comprises
    providing a hollow mold having an open end and having an internal surface of the configuration of the article to be produced, and
    while supporting the mold with its open end facing downward and rotating it about a vertical axis aligned with its end opening and heating it externally to a temperature sufficient to fuse said material on said internal surface,
    blowing particles of said material to said surface and adhering to said surface and fusing together thereupon by the heat of said surface some of the blown particles as they impinge upon said surface,
    flowing through said open end and collecting below the mold the blown particles not adhered to said surface,
    continually re-blowing such non-adhered particles to said surface,
    and continuing the operations until particles of said material have been built up into a fused layer of the thickness required for said article and covering said surface.

4. The process of claim 3, and thereafter discontinuing the heating of the mold and blowing cooling air against the fused layer therein to congeal the article formed.

5. The process of producing a shaped hollow article with differently colored wall regions, which comprises
    providing a hollow mold having an open end and having an internal surface of the configuration of the article to be produced,
    providing a plurality of differently colored pulverulent thermoplastic resin materials, each of which will form a film under the influence of heat and each in a measured quantity corresponding to the weight thereof desired to be incorporated into said article,
    and, while supporting the mold with its open end facing downward and rotating it about a vertical axis aligned with its end opening and heating it externally to a temperature sufficient to fuse said materials on said internal surface,
    continually blowing particles of one of said materials to said surface and adhering to said surface and fusing together thereupon by the heat of said surface some of the blown particles as they impinge upon said surface,
    flowing through said open end and collecting below the mold the blown particles not adhered to said surface,
    and continually re-blowing said non-adhered particles to said surface, until a desired quantity of said one material has been adhered to and fused into a layer on said surface,
    and then similarly blowing, adhering, fusing together, flowing out, collecting and re-blowing particles of each other of said materials to obtain an article composed of integrally fused differently colored wall portions.

6. An apparatus for molding a hollow article from a thermoplastic resin material, comprising
    a hollow mold that is open at one end and has an internal surface of the configuration of the article to be produced, a turntable rotatable on a vertical axis and adapted to support and rotate said mold with said open end facing downward, means for heating the mold externally as it is rotated on the turntable, means extending into the mold on the turntable for spraying particles of said materal to said surface as the mold is heated and rotated, so as continually to adhere some of the sprayed particles to said surface and build up a fused layer of them thereon, means for feeding said material at a regulated rate to said spraying means, means disposed below said open end for collecting the sprayed material not adhered to said surface, and means for continually delivering the last-mentioned material from said collecting means to said feeding means.

7. An apparatus according to claim 6, said spraying means comprising a pipe extending centrally through said turntable into said mold and spray nozzles on said pipe for directing particles of said material to said internal surface.

8. An apparatus according to claim 6, said spraying means comprising a pipe extending centrally through said turntable into said mold, spray nozzles on said pipe for directing particles of said material to said internal surface, and a blower connected with said pipe for forming and blowing through said pipe and said nozzles a gaseous suspension of particles of said thermoplastic material.

9. An apparatus according to claim 6, said heating means comprising an elongated heating device fixed at one side of said turntable and extending substantially parallel to the outer side of said mold.

10. An apparatus according to claim 9, said heating device extending from end to end of the mold and having a portion extended radially over approximately half the top surface of the mold.

11. An apparatus according to claim 10, at least said extended portion of said heating device being swingable away from the mold to provide clearance for removal of the mold from the turntable.

12. An apparatus according to claim 9, and means including rollers mounted in fixed relation to said heating device and resiliently urged against the outside of the mold on said turntable for maintaining the heating means at a substantially constant distance from said mold.

13. The process of producing a molded hollow article from finely divided polyethylene, which comprises, providing a hollow mold that is open at one end and has an internal surface of the configuraiton of the article to be produced, providing a measured quantity of the polyethylene corresponding to the weight thereof to be incorporated into said article, and, while supporting the mold with its open end facing downward and heating it externally by flames at its outer side and rotating slowly relative to the flames so as to hold said surface evenly at a temperature sufficient to fuse said polyethylene thereon, conducting particles of the polyethylene into the mold through said open end and spraying said particles in loose form to said heated surface, adhering to said surface and fusing together thereupon by the heat from said surface at least some of the sprayed particles impinging thereagainst, maintaining the mold and the spray in relative movement so as to distribute the impinging particles to desired locations over said surface, flowing out of said open end and collecting below the mold the portion of the sprayed particles not adhered to said surface, continually re-spraying said non-adhered portion to said surface until substantially all of said measured quantity has been fused into a coherent layer covering said surface, and thereafter discontinuing the heating, and cooling said layer in the mold.

References Cited by the Examiner

UNITED STATES PATENTS

| | | | |
|---|---|---|---|
| 1,510,117 | 9/1924 | Von Vass | 264—309 |
| 1,807,858 | 6/1931 | Morris | 264—73 |
| 2,285,370 | 6/1942 | Staelin | 264—309 |
| 2,822,024 | 2/1958 | Himmelheber et al. | 264—37 |
| 2,935,765 | 5/1960 | Ciampolini | 264—302 |
| 3,009,209 | 11/1961 | Weinbrenner et al. | 260—310 |
| 3,059,281 | 10/1962 | Visser et al. | 264—302 |
| 3,187,381 | 6/1965 | Britten | 364—309 X |
| 3,197,827 | 8/1965 | Haughton et al. | 264—311 X |

FOREIGN PATENTS

| | | |
|---|---|---|
| 869,082 | 10/1941 | France. |
| 845,059 | 8/1960 | Great Britain. |

OTHER REFERENCES

Schwarz, "Flame-spraying and Sintering of Plastics," British Plastics, November 1958, pages 482–485.

ROBERT F. WHITE, *Primary Examiner.*

ALEXANDER H. BRODMERKEL, *Examiner.*

J. R. DUNCAN, L. S. SQUIRES, *Assistant Examiners.*